(12) United States Patent
Duyvesteyn

(10) Patent No.: US 11,821,057 B2
(45) Date of Patent: Nov. 21, 2023

(54) RECOVERY OF CRITICAL METALS FROM SX-EW COPPER RAFFINATE AND OTHER SOLUTIONS DERIVED FROM LEACHING ORES WITH SULFURIC ACID

(71) Applicant: Scandium International Mining Corporation, Sparks, NV (US)

(72) Inventor: Willem P. C. Duyvesteyn, Reno, NV (US)

(73) Assignee: Scandium International Mining Corporation, Sparks, NV (US)

(*) Notice: Subject to any disclaimer, the term of this patent is extended or adjusted under 35 U.S.C. 154(b) by 167 days.

(21) Appl. No.: 17/192,356

(22) Filed: Mar. 4, 2021

(65) Prior Publication Data
US 2021/0277497 A1    Sep. 9, 2021

Related U.S. Application Data

(60) Provisional application No. 63/038,873, filed on Jun. 14, 2020, provisional application No. 62/986,466, filed on Mar. 6, 2020.

(51) Int. Cl.
*C22B 3/08* (2006.01)
*C22B 7/00* (2006.01)
(Continued)

(52) U.S. Cl.
CPC ............... *C22B 3/08* (2013.01); *C22B 7/007* (2013.01); *C22B 15/0071* (2013.01);
(Continued)

(58) Field of Classification Search
CPC ....... C22B 3/08; C22B 7/007; C22B 15/0071; C22B 19/22; C22B 21/0023;
(Continued)

(56) References Cited

U.S. PATENT DOCUMENTS 3,214,239 A   10/1965  Hazen et al.
5,049,363 A    9/1991  Feuling
(Continued)

FOREIGN PATENT DOCUMENTS

DE          60003530      *  3/1999

OTHER PUBLICATIONS

Sole, Kathryn et al. Present and Future Applications of Ion Exchange in Hydrometallurgy: an Overview, Society of Chemical Industry, IEx 2016—Hydrometallurgy Session (Year: 2016).*
(Continued)

*Primary Examiner* — Brian D Walck
*Assistant Examiner* — Danielle Carda
(74) *Attorney, Agent, or Firm* — John A. Fortkort; Fortkort & Houston PC

(57) ABSTRACT

A method for extracting secondary metal values from a sulfuric acid leachate is provided. The method includes providing a leachate which contains a primary metal and a plurality of secondary metals, wherein the primary metal is selected from the group consisting of Cu, Li and Ni and is derived from sulfuric acid leaching of an ore; passing the leachate through a first ion exchange resin which is selective to, and releasably binds, the plurality of secondary metals; stripping the plurality of secondary metals from the second or third ion exchange resins, thereby obtaining a first extract; and recovering the secondary metals from the first extract.

24 Claims, 1 Drawing Sheet

(51) Int. Cl.
| | |
|---|---|
| C22B 61/00 | (2006.01) |
| C22B 35/00 | (2006.01) |
| C22B 15/00 | (2006.01) |
| C22B 3/00 | (2006.01) |
| C22B 21/00 | (2006.01) |
| C22B 47/00 | (2006.01) |

(52) U.S. Cl.
CPC .......... *C22B 19/22* (2013.01); *C22B 21/0023* (2013.01); *C22B 23/043* (2013.01); *C22B 35/00* (2013.01); *C22B 47/0063* (2013.01); *C22B 61/00* (2013.01)

(58) Field of Classification Search
CPC ... C22B 23/043; C22B 35/00; C22B 47/0063; C22B 61/00; C22B 3/26; C22B 3/42; Y02P 10/20
USPC .......................................................... 75/743
See application file for complete search history.

(56) References Cited

U.S. PATENT DOCUMENTS

| | | | |
|---|---|---|---|
| 6,440,383 | B1 | 8/2002 | Duyvesteyn et al. |
| 8,372,367 | B2 | 2/2013 | Duyvesteyn |
| 8,658,114 | B2 | 2/2014 | Nebeker et al. |
| 8,986,424 | B2 | 3/2015 | Nebeker |
| 9,068,247 | B2 | 6/2015 | Marston et al. |
| 9,410,227 | B2 | 8/2016 | Boudreault et al. |
| 9,677,155 | B2 | 6/2017 | Mihaylov et al. |
| 9,982,325 | B2 | 5/2018 | Duyvesteyn |
| 9,982,326 | B2 | 5/2018 | Duyvesteyn |
| 2001/0001650 | A1* | 5/2001 | Duyvesteyn ........ C22B 23/0484 423/139 |
| 2006/0222580 | A1 | 10/2006 | Tinkler et al. |
| 2011/0298270 | A1 | 12/2011 | Duyvesteyn |
| 2012/0204680 | A1 | 8/2012 | Duyvesteyn |
| 2012/0207656 | A1 | 8/2012 | Duyvesteyn |
| 2012/0263637 | A1 | 10/2012 | Duyvesteyn |
| 2014/0076805 | A1* | 3/2014 | Massingill ............. C07C 67/56 210/634 |
| 2015/0104361 | A1 | 4/2015 | Boudreault et al. |
| 2015/0307966 | A1 | 10/2015 | Voight et al. |
| 2016/0153070 | A1 | 6/2016 | Duyvesteyn |
| 2016/0289795 | A1 | 10/2016 | Duyvesteyn |
| 2018/0030577 | A1 | 2/2018 | Duyvesteyn |
| 2018/0371579 | A1* | 12/2018 | Higaki ..................... C22B 3/42 |

OTHER PUBLICATIONS

Y.A. El-Nadi, Solvent Extraction and Its Applications on Ore Processing and Recovery of Metals: Classical Approach, Separation and Purification Reviews (Year: 2017).*
David, CuSO4 Copper Sulfate Crystallization, 911 Metallurgist, Jun. 18, 2017 (Year: 2017).*
Angelov, T. et al. (2000). The Successful Commercial Implementation of the Combined Leach Ion Exchange—Solvent Extraction—Electrowinning Process at the Bucim Copper Project. University of Mining and Geology "St. Ivan Rilski", Bulgaria.
Copp, R. (2016). Recovery of Yttrium and Neodymium From Copper Pregnant Leach Solutions By Solvent Extraction. The University of Arizona.
Sole, K. et al. (2016). Recovery of copper from Chilean mine waste waters. Mining Meets Water—Conflicts and Solutions IMWA 2016 Proceedings.
Sole, K. et al. (2016). Present and future applications of ion exchange in hydrometallurgy: An overview. Society of Chemical Industry—IEx 2016 Proceedings.
Kordosky, G.A. (2002). Copper recovery using leach/solvent extraction/electrowinning technology: Forty years of innovation, 2.2 million tonnes of copper annually. The Journal of The South African Institute of Mining and Metallurgy.
Lu, B. C., Graydon, W. F. (1954). The Rate Of Dissolution Of Copper. Canadian Journal of Chemistry, 32(2), 153-163. doi:10.1139/v54-022.

* cited by examiner

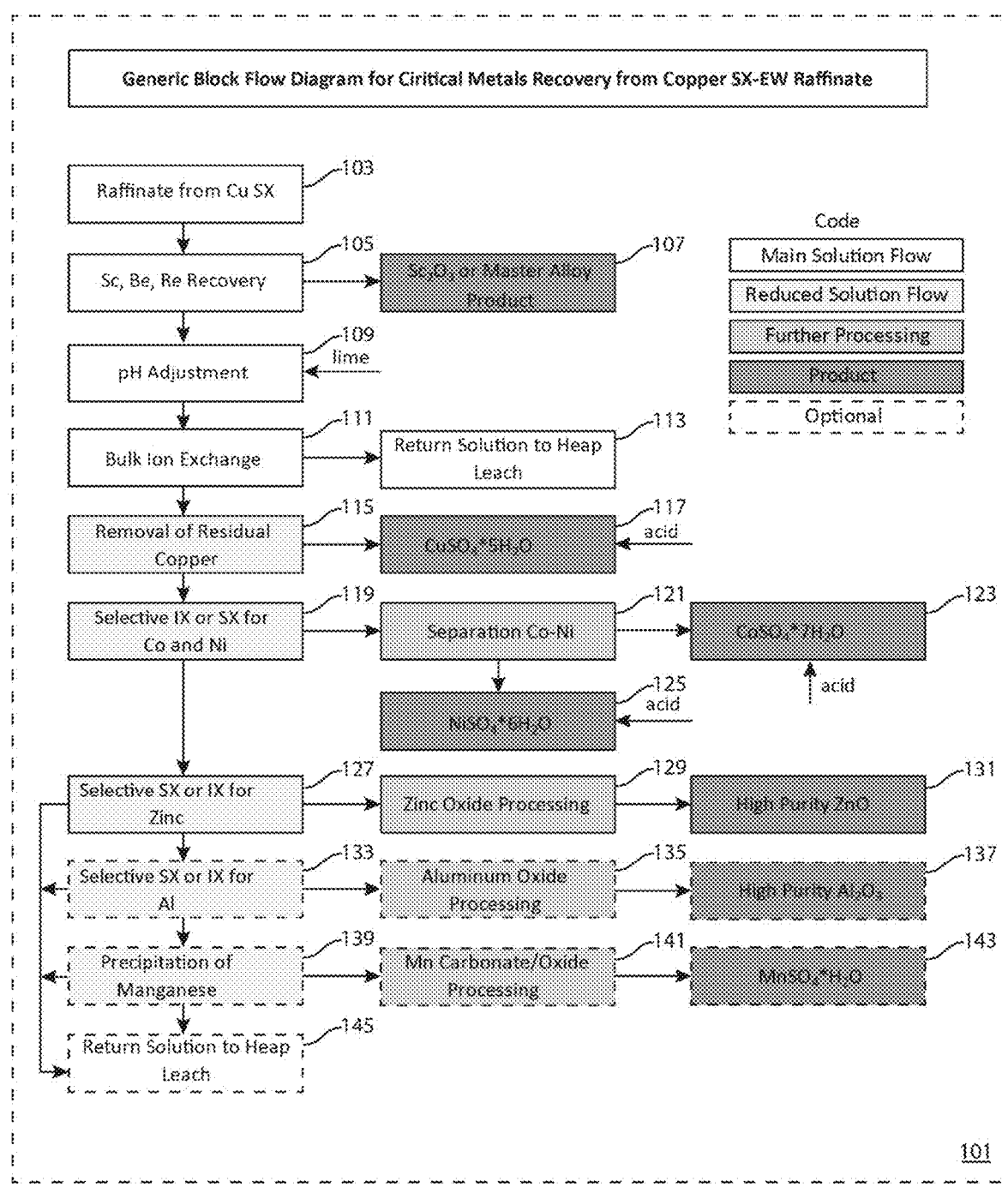

RECOVERY OF CRITICAL METALS FROM SX-EW COPPER RAFFINATE AND OTHER SOLUTIONS DERIVED FROM LEACHING ORES WITH SULFURIC ACID

CROSS-REFERENCE TO RELATED APPLICATION

This application claims the benefit of priority from U.S. provisional application No. 63/038,873, filed Jun. 14, 2020, having the same inventor, entitled "RECOVERY OF CRITICAL METALS FROM SX-EW COPPER RAFFINATE AND OTHER SOLUTIONS DERIVED FROM LEACHING ORES WITH SULFURIC ACID", and which is incorporated herein by reference in its entirety; and also claims the benefit of priority from U.S. provisional application No. 62/986,466, filed Mar. 6, 2020, having the same inventor, entitled "RECOVERY OF CRITICAL METALS FROM SX-EW COPPER RAFFINATE", and which is incorporated herein by reference in its entirety.

FIELD OF THE DISCLOSURE

The present disclosure relates generally to systems and methodologies for the recovery of metal values from copper raffinates and other solutions derived from leaching ores with sulfuric acid, and more particularly to systems and methodologies for the non-selective recovery of metal values using ion exchange or solvent extraction processes, followed by selective recovery of the metal values from the resulting eluate.

BACKGROUND OF THE DISCLOSURE

Various processes are known in the art for recovering metal values from metal ores and other feedstocks. Many of these processes target a specific, or primary metal, and yield a raffinate as a byproduct. For example, the solvent extraction-electrowinning (SX-EW) process commonly used to recover copper values in the copper mining industry typically generates raffinates that contain various other metal values. Another example is the leaching lithium containing ores with sulfuric acid whereby not only lithium is dissolved but also various critical or secondary metals. A further example is the leaching of nickeliferous laterite ores, whereby not only nickel but also other critical metals are put into solution by sulfuric acid leaching. There is considerable interest in recovering these other or secondary metal values from these raffinate and leach solutions, since doing so improves the economics of the overall process. For example a copper heap leach solution may contain say 1 gpl Cu and 2 ppm Sc. Using today's metal prices the copper value of one liter of leach solution will be about $0.08/liter and the value of the contained scandium will amount to $0.03/liter or about 25% of the copper value. Accordingly, various methods have been proposed in the art for recovering metal values from solvent extraction solutions.

For example, U.S. Pat. No. 8,986,424 (Nebeker) discloses a method for rhenium recovery from copper solvent extraction solutions. The method includes determining whether the copper solvent extraction solution contains trace amounts of rhenium. If so, a feedstock from the copper solvent extraction solution is provided, which is then filtered, producing filtered feedstock. Trace amounts of rhenium are absorbed from the filtered feedstock using a supply of ion exchange resin selective for rhenium. The ion exchange resin is washed. Trace amounts of rhenium are eluted from the ion exchange resin using a first amount of eluent, a second amount of eluent and a third amount of eluent. The first amount and the third amount of eluent produce supplemental feedstock and the second amount of eluent produces rhenium eluate. The rhenium eluate is collected, and the ion exchange resin is protonated.

Similarly, U.S. Pat. No. 8,658,114 (Nebeker et al.) discloses a method for extracting cobalt from copper raffinate. This method commences with the provision of a supply of raffinate containing at least cobalt, copper, ferric iron and nickel. The raffinate is pretreated using one or all of the steps of (a) raising the raffinate pH level; (b) removing solids; and (c) reducing ferric iron to ferrous iron. Substantially all copper is removed using a first ion exchange resin selective for copper. A second ion exchange resin selective to both cobalt and nickel is used to remove the cobalt and nickel. Cobalt and nickel are then separately eluted from the second ion exchange resin.

U.S. Pat. No. 9,068,247 (Marston et al.) discloses a method for recovering nickel and cobalt from a pregnant leach solution (PLS), which includes a process for treating the cobalt containing raffinate generated by the process. The method includes (a) passing the PLS through an ion exchange bed to load nickel onto the ion exchange resin and produce a cobalt-containing raffinate solution, (b) passing sulfuric acid through the loaded bed to strip nickel from the resin and produce a nickel-containing eluate, (c) rinsing the stripped ion exchange bed, (d) adjusting the pH of the cobalt-containing raffinate solution to a pH of at least 2.3, (e) passing the cobalt-containing raffinate solution through an ion exchange bed to pre-load cobalt on the ion exchange resin, (f) repeating step (a) though (e) until the cobalt concentration of the cobalt-containing raffinate solution increases to >2x of the PLS, (g) removing a portion of the cobalt-containing raffinate solution of step (d) from the nickel recovery circuit, and (h) passing a portion of the cobalt-containing raffinate solution from step (d) to step (e).

SUMMARY OF THE DISCLOSURE

In one aspect, a method is provided for extracting critical metal values (such as, for example, Sc, Ni, Co, Cu, Zn, Al, Mn, Re, Be, Cs an Rb) from a copper raffinate or from other leach solutions that have been processed for a primary metal recovery. The method comprises (a) providing a leachate which contains a primary metal and a plurality of secondary metals, wherein the primary metal is selected from the group consisting of Cu, Li and Ni and is derived from sulfuric acid leaching of an ore; (b) passing the leachate through a primary metals recovery process such as solvent extraction (i.e. copper), ion exchange (i.e. nickel) or crystallization (i.e. lithium) and producing a primary metal depleted waste solution; (c) processing the waste solution with an ion exchange resin which is selective to, and releasably binds, the plurality of secondary metals; (c) stripping the plurality of secondary metals, thereby obtaining a first extract; and (d) recovering the secondary metals from the first extract. In some embodiments, prior to passing the leachate through a primary metals recovery process, the leachate is first passed through a second ion exchange resin which is selective to, and releasably binds, one of the plurality of secondary metals. The one of the secondary metals is then stripped from the second exchange resin, thereby obtaining a second extract, and the one of the secondary metals is recovered from the second extract.

BRIEF DESCRIPTION OF THE DRAWINGS

FIG. 1 is a flow chart depicting an embodiment of a method for recovering secondary metal values from copper raffinates in accordance with the teachings herein.

DETAILED DESCRIPTION

As illustrated by the foregoing references, current methodologies for recovering secondary metal values from copper SX-EW raffinates or other processed leach solutions typically feature the use of metal specific ion exchange (IX) processes. This is primarily because the concentration of any of the critical metals under consideration is typically in the ppm (parts per million) range rather than gpl (grams per liter) range, and SX is not an economically viable approach to the recovery of metals at such dilute concentrations. The IX resin of choice for these above mentioned patented applications is typically a resin having one or more picolylamine moieties.

Unfortunately, the foregoing approach has several problems. First of all, in order to afford selectivity, an IX resin must be utilized that is selective for each individual metal in the copper SX-EW raffinate or processed leach solution. Secondly, picolylamine resins are much more expensive than conventional IX resins (typically by more than an order of magnitude), and their use thus has a significant adverse effect on the economics of the process. Thirdly, IX resins with picolylamine moieties are only selective for certain metals, such as cobalt and nickel, but other metals (such as, for example, scandium, rhenium and zinc) do not load on these resins. Fourthly, the critical metals produced from the copper SX-EW raffinate are not produced in large quantities, but the conventional approach of producing a salable product from such raffinates is to produce electrolytic metals. Using electrolysis to produce metals such as nickel, cobalt and zinc is a very capital intensive and high energy process. As a result of the foregoing issues, no processes exist in the art for economically recovering secondary critical metal values from copper SX-EW raffinates in small and salable quantities. This situation persists despite the fact that the chemistry of these raffinates is well understood, and the metal values in these raffinates have been identified.

It has now been found that the foregoing infirmities may be overcome with the systems and methodologies disclosed herein. In preferred embodiments of these systems and methodologies, a bulk ion exchange step (which may utilize an inexpensive ion exchange resin) and associated stripping step are utilized as a preliminary step to bulk concentrate critical metals from a raffinate obtained from a Cu SX process or processed leach solution. The concentrated multimetal solution resulting from these steps may then be subjected to selective extraction processes (such as, for example, selective IX, SX or precipitation) to recover individual metal values from this concentrated solution. Notably, by performing the bulk concentration step early in the process rather than later, a lower volume solution with a much higher metal content will be produced and the subsequent selective extraction processes may be performed much more economically and effectively than would be the case if performed on the more dilute copper SX-EW raffinate.

A particular, nonlimiting embodiment of the systems and methodologies covering processing of a copper raffinate solution disclosed herein is depicted in FIG. 1. With reference thereto, the method 101 in this particular embodiment commences with the provision 103 of a first raffinate from a copper SX-EW process. In some embodiments, as where the raffinate contains significant levels of scandium, beryllium, and/or rhenium, the first raffinate may be subjected to a preliminary scandium/beryllium/rhenium extraction step 105 to yield a scandium/beryllium/rhenium product. In the case of scandium, for example, this may include generation of $Sc_2O_3$ or a master alloy product. This may involve, for example, treatment of the first raffinate with oxalic acid to yield an oxalate precipitate, after which the precipitate may be removed via a suitable filtration process. Alternatively, it may include a process whereby a scandium (or beryllium or rhenium) ion exchange resin is employed for the initial metal recovery step. Of course, one skilled in the art will appreciate that such a step may be performed later in the process as well.

The scandium depleted solution (an eluate if ion exchange is used for scandium recovery) is then subjected to a pH adjustment step 109 which preferably involves the addition of lime to the solution, thus yielding a pH adjusted raffinate. The pH adjusted raffinate is then subjected to bulk ion exchange 111 using a resin that releasably binds a plurality of metal values (such as, for example, Sc, Ni, Co, Cu, Zn, Re, Be, Cs and/or Rb), and yields waste solution which may be discharged 113 to the process such as a heap leaching operation. Preferably, the ion exchange resin utilized in this step has a moiety selected from the group consisting of iminodiacetic acid, sulfonate, carboxylic acid, amidoxime and/or aminophosphonic moieties. In some embodiments, the ion exchange resin may be non-selective to certain metals, such as sodium, calcium or magnesium, which are not critical or do not present sufficient value to justify their extraction from the raffinate. If aluminum and/or manganese are present, consideration may be given to co-production of these metals as their oxides or sulfates, as seen in the process options described below and in FIG. 1.

The bulk-loaded resin is then stripped to yield a first extract. Compared to the original copper SX-EW raffinate, the first extract contains a much more concentrated mixture of the critical metal ions. Moreover, the first extract may also contain a smaller number of metal species, especially if the ion exchange resin utilized in the bulk ion exchange process is non-selective to certain non-critical metals.

Selective IX or SX is then utilized to extract residual copper values 115 from the first extract, thus yielding a loaded resin or pregnant solution and a second raffinate. The loaded resin or pregnant solution is then stripped or isolated to yield a second extract. $CuSO_4$ (preferably in the form of a hydrate, and more preferably in the form of a pentahydrate) is then isolated 117 from the second extract, preferably by crystallization (as, for example, through the addition of a concentrated acid, such as sulfuric acid, by a process known as salting-out crystallization). Alternatively the crystallization can be enhanced by the addition of an alcohol such as methanol, based on the principle that metal sulfate solution activities are increased by the removal of some water from the solution.

Selective IX or SX is then utilized to extract Co and/or Ni 119 values from the second raffinate, thus yielding a loaded resin or pregnant solution and a third raffinate. The loaded resin or pregnant solution is then stripped or isolated to yield a third extract. The Co and Ni values are then separated 121 from the third extract (as, for example, through IX, SX and/or selective recrystallization) to yield, respectively, $CoSO_4$ 123 (preferably in the form of a heptahydrate) and $NiSO_4$ 125 (preferably in the form of a hexahydrate). Either or both of these products may be recrystallized from the third extract through the addition of acid or methanol as provided for the production copper sulfate.

Selective IX or SX is then utilized to extract Zn 127 values from the third raffinate, followed by zinc oxide processing 129 (after a suitable stripping and recovery step) which may yield high purity ZnO 131. This process may also yield a waste solution which may be returned to a heap 145. The ZnO can be produced using a process as provided in U.S. Pat. No. 5,441,712 (Duyvesteyn).

In a similar manner, selective IX or SX may then be utilized to extract aluminum 133 values from the third raffinate, followed by aluminum oxide processing 135 (after a suitable stripping and recovery step) which may yield high purity $Al_2O_3$ 137. This process may also yield a waste solution which may be returned to a heap 145.

In an analogous manner, selective IX or SX may then be utilized to extract Mn 139 values from the third raffinate, followed by managanese sulfate processing 141 (after a suitable stripping and recovery step) which may yield high purity $MnSO_4*xH_2O$ 143. This process may also yield a waste solution which may be returned to a heap 145.

The above description the copper raffinate option of the present invention is illustrative, and is not intended to be limiting. It will thus be appreciated that various additions, substitutions and modifications may be made to the above described embodiments without departing from the scope of the present invention. Accordingly, the scope of the present invention should be construed in reference to the appended claims. In these claims, absent an explicit teaching otherwise, any limitation in any dependent claim may be combined with any limitation in any other dependent claim without departing from the scope of the invention, even if such a combination is not explicitly set forth in any of the following claims.

What is claimed is:

1. A method for extracting secondary metal values from a sulfuric acid leachate, comprising:
   providing a leachate which contains a primary metal and a plurality of secondary metals, wherein the primary metal is selected from the group consisting of Cu, Li and Ni and is derived from sulfuric acid leaching of an ore;
   passing the leachate through a first ion exchange resin which is selective to, and releasably binds, the plurality of secondary metals;
   stripping the plurality of secondary metals from the first ion exchange resin, thereby obtaining a first extract; and
   recovering the secondary metals from the first extract;
   wherein the sulfuric acid leachate is obtained by leaching a lithium ore with sulfuric acid, wherein the resulting leachate contains scandium or aluminum values, and wherein the scandium or aluminum values are selectively recovered by ion exchange.

2. The method of claim 1, further comprising:
   prior to passing the leachate through the first ion exchange resin, passing the leachate through a second ion exchange resin which is selective to, and releasably binds, one of the plurality of secondary metals;
   stripping the one of the secondary metals from the second exchange resin, thereby obtaining a second extract; and
   recovering the one of the secondary metals from the second extract.

3. The method of claim 2, wherein the one of the secondary metals is Sc.

4. The method of claim 2, wherein the leachate is a raffinate from a copper extraction process, wherein the plurality of secondary metals includes residual copper, and wherein the second ion exchange resin is selective to, and releasably binds, copper.

5. The method of claim 4, further comprising:
   recovering copper values from the second extract by performing at least one step selected from the group consisting of (a) passing the second extract through the second ion exchange resin, wherein the second ion exchange resin is selective to copper, and (b) subjecting the second extract to a solvent exchange process which is selective to copper.

6. The method of claim 5, wherein the Cu values are recovered as electrowon copper.

7. The method of claim 5, wherein the Cu values are recovered as a pentahydrate of copper sulfate.

8. The method of claim 7, wherein recovering copper values from the second extract includes generating a third raffinate, wherein the third raffinate includes Zn, and further comprising the step of:
   recovering Zn values from the third raffinate by performing at least one step selected from the group consisting of:
   (a) passing the third raffinate through a second ion exchange resin which is selective to Zn, and
   (b) subjecting the third raffinate to a solvent exchange process which is selective to Zn.

9. The method of claim 8, wherein the Zn values are recovered as ZnO.

10. The method of claim 5, wherein recovering copper values from the second extract includes generating a second raffinate, wherein the second raffinate includes at least one element selected from the group consisting of Co and Ni, and further comprising the step of:
    recovering from the second raffinate at least one metal value selected from the group consisting of Co values and Ni values by performing at least one step selected from the group consisting of:
    (a) passing the second raffinate through a third ion exchange resin which is selective to said at least one element selected from the group consisting of Co and Ni, and
    (b) subjecting the second raffinate to a solvent exchange process which is selective to said at least one element selected from the group consisting of Co and Ni.

11. The method of claim 10, wherein recovering copper values from the second extract includes performing at least one step selected from the group consisting of:
    (a) passing the second extract through the second ion exchange resin, wherein the second ion exchange resin is selective to both Co and Ni, and
    (b) subjecting the second extract to a solvent exchange process which is selective to both Co and Ni.

12. The method of claim 5, wherein the Cu values are recovered as copper sulfate.

13. The method of claim 2, wherein the one of the secondary metals is Be.

14. The method of claim 2, wherein the one of the secondary metals is Re.

15. The method of claim 2, wherein the one of the secondary metals is Cu.

16. The method of claim 1, wherein said first ion exchange resin has a moiety selected from the group consisting of iminodiacetic acid, sulfonate, carboxylic acid, amidoxime and aminophosphonic moieties.

17. The method of claim 1, wherein the plurality of secondary metals includes at least two metal values selected from the group consisting of Sc, Ni, Co, Cu, Zn, Al, Mn, Re, Be, Cs and Rb.

18. The method of claim 1, wherein the plurality of secondary metals includes at least three metal values selected from the group consisting of Sc, Ni, Co, Cu, Zn, Re, Be, Cs and Rb.

19. The method of claim 1, wherein the plurality of secondary metals includes at least four metal values selected from the group consisting of Sc, Ni, Co, Cu, Zn, Re, Be, Cs and Rb.

20. The method of claim 1, wherein the plurality of secondary metals includes at least five metal values selected from the group consisting of Sc, Ni, Co, Cu, Zn, Re, Be, Cs and Rb.

21. The method of claim 1, wherein the plurality of secondary metals includes Sc, Ni, Co, Cu, Zn, Re, Be, Cs and Rb.

22. The method of claim 1, wherein the resulting leachate contains scandium values.

23. The method of claim 1, wherein the resulting leachate contains aluminum values.

24. The method of claim 23, wherein the resulting leachate contains aluminum values, and wherein the aluminum values are recovered by a process selected from the group consisting of ion exchange and solvent extraction.

\* \* \* \* \*